United States Patent
Hartmann

(10) Patent No.: US 6,757,605 B2
(45) Date of Patent: Jun. 29, 2004

(54) METHOD AND DEVICE FOR SITUATION-DEPENDENT AND DRIVER-DEPENDENT ATTENUATION OF ESP STABILIZATION MEASURES

(75) Inventor: Uwe Hartmann, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/243,159

(22) Filed: Sep. 13, 2002

(65) Prior Publication Data
US 2003/0060960 A1 Mar. 27, 2003

(30) Foreign Application Priority Data
Sep. 15, 2001 (DE) .......................... 101 45 625
Nov. 2, 2001 (DE) .......................... 101 54 028

(51) Int. Cl.[7] .............................................. G06F 19/00
(52) U.S. Cl. ........................ 701/70; 701/93; 180/179
(58) Field of Search .............................. 701/70, 1, 93, 701/94, 110, 48; 180/178, 179, 197, 158; 280/170, 178, 179

(56) References Cited

U.S. PATENT DOCUMENTS 6,006,848 A * 12/1999 Boehringer et al. ........ 180/178
6,408,687 B1 * 6/2002 Ashrafi et al. ............. 73/118.1

FOREIGN PATENT DOCUMENTS

| DE | 199 49 286 | 4/2001 |
| DE | 199 64 032 | 7/2001 |
| EP | 0 339 056 | 11/1989 |

* cited by examiner

Primary Examiner—Marthe Y. Marc-Coleman
(74) Attorney, Agent, or Firm—Kenyon & Kenyon

(57) ABSTRACT

A device and a method for regulating at least one vehicle dynamics controlled variable (vGi) which describes a motion of a vehicle, is described. At least one vehicle dynamics variable is determined in a determination device. A regulator device with which actuators are triggered for regulating the at least one vehicle dynamics controlled variable is provided, the sensitivity of the regulator device being influenceable. Sensitivity of the regulator device in at least one operating state of the vehicle is determined by at least one of the vehicle dynamics variables thus determined.

10 Claims, 2 Drawing Sheets

METHOD AND DEVICE FOR SITUATION-DEPENDENT AND DRIVER-DEPENDENT ATTENUATION OF ESP STABILIZATION MEASURES

BACKGROUND INFORMATION

German Published Patent Application No. 199 49 286 describes a device for regulating at least one vehicle motion variable describing a motion of a vehicle. To this end, the device contains regulator means with which actuators are triggered for regulating the vehicle motion variable. Furthermore, the device contains determination means with which a bad stretch of road variable, which describes the vehicle's drive on a stretch of bad road, is determined. The regulator means is influenced as a function of the bad stretch of road variable, such that the sensitivity of the regulator means is adapted to the vehicle's drive on a stretch of bad road. European Patent No. 0 339 056 describes a method of regulating the stability of a vehicle in traveling along a curve, where the vehicle speed and the coefficient of friction between the tires and the road are determined. In this method, the steering angle and the rate of rotation of the vehicle about the vertical axis (yaw rate) are also determined, and a lower limit value characteristic of the yaw rate is determined as a function of the steering angle, taking into account the vehicle speed and the coefficient of friction. The brake pressure is reduced when the measured yaw rate drops below the limit value characteristic. German Published Patent Application No. 199 64 032 describes a method and a device for stabilizing a vehicle. In this method, a transverse dynamics variable which describes the transverse dynamics of the vehicle is regulated to stabilize the vehicle. The transverse dynamics variable is regulated by limiting the float angle of the vehicle to a predetermined value. Regulation of the transverse dynamics variable is altered by input by the driver to allow a larger float angle than the predetermined value.

SUMMARY OF THE INVENTION

In vehicle dynamics control (VDC) systems (ESP= electronic stability program), the driver selects a desired driving performance by selecting the steering angle. A setpoint for the yaw rate is calculated as a function of the steering angle, the transverse acceleration and the longitudinal speed of the vehicle. If the measured yaw rate does not match the calculated setpoint yaw rate, the vehicle dynamics controller will attempt to adapt the yaw rate to the setpoint, e.g., through changes in brake pressure on the individual wheels or through active steering operations. The phase shift between the change in the steering angle and the change in the yaw rate due to the inherent dynamics of the vehicle is taken into account through suitable filters. It is desirable, especially with certain sporty vehicles, to tolerate an admissible system deviation between the setpoint yaw rate and the actual yaw rate in many cases. Suitable measures are performed to suppress the vehicle controller intervention measures in these cases.

With the known implementations, it is impossible to allow greater permanent system deviations between the yaw rate setpoint and the actual yaw rate depending on the situation. Thus, in the case of front-wheel-drive vehicles, for example, it is impossible to steer back in coming out of a turn on a smooth road surface and to straighten out the vehicle again slowly merely by accelerating without any active braking intervention by the vehicle dynamics controller. However, that is precisely what is often desired in the case of sporty vehicles. Stabilizing measures should be taken only when the driver must definitely countersteer ("countersteering" means that the steering angle is rotated in the opposite direction, past the zero position) or when the float angle of the vehicle increases. If the driver steers back only slightly ("steering back" means that the steering angle is reduced but is not rotated in the other direction, past the zero position), then the regulator should assume the stabilization function and should intervene with full sensitivity. If the driver steers back forcefully, this is sufficient with a suitably tuned vehicle to straighten the vehicle out even without a braking intervention measure. It is thus important to prevent the stabilization measure on the part of the driver (due to steering back forcefully) to be superimposed on that of the regulator (through a braking intervention measure on the front wheel which is on the outside of the turn, for example), in which case the stabilization may subjectively appear to be too intense. The present invention described here opens up the possibility of expanding the known vehicle dynamics control (VDC, ESP) in the manner described above.

The present invention relates to a device for regulating at least one controlled variable of vehicle dynamics which describes a motion of a vehicle, the device
  containing the determination means with which at least one vehicle dynamics variable is determined, and
  containing regulator means for triggering actuators for regulating the at least one vehicle dynamics controlled variable, the sensitivity of the regulator means being influenceable.

The advantage of the present invention is that the sensitivity of the regulator means in at least one operating state of the vehicle is influenced by at least one of the vehicle dynamics variables thus determined.

The vehicle dynamics variables determined by the determination means may, of course, also include the vehicle dynamics controlled variables.

An advantageous embodiment of the present invention is characterized in that at least one transverse acceleration variable and one steering angle variable are determined as vehicle dynamics variables by the determination means, and the sensitivity of the regulator means is influenced
  when the operating state is driving with a transverse acceleration of the vehicle different from zero and driver-operated steering against the direction of transverse acceleration or
  when the vehicle is oversteered as the operating state and is traveling with a transverse acceleration of the vehicle different from zero, and driver-operated steering is occurring in the direction of transverse acceleration.

Another advantageous embodiment of the present invention is characterized in that at least one transverse acceleration variable and one steering angle variable are determined by the determination means as vehicle dynamics variables, and the sensitivity of the regulator means is influenced
  when the operating state of the vehicle is traveling with a transverse acceleration which is different from zero and driver-operated steering is occurring against the direction of transverse acceleration, or
  when the operating state of the vehicle is an oversteered state and the vehicle is traveling with a transverse acceleration which is different from zero and driver-operated steering is occurring in the direction of transverse acceleration, the oversteered state being defined in particular by the actual yaw rate exceeding the setpoint yaw rate in absolute value.

It is also possible to define the term "oversteering" as follows: oversteering is when the tire slip angle on the rear axle increases more rapidly than the tire slip angle on the front axle with an increase in transverse acceleration.

In an advantageous embodiment, the present invention is characterized in that two different vehicle dynamics variables thus determined are compared, and the sensitivity of the regulator means is influenced differently, depending on the outcome of this comparison.

Another advantageous embodiment is characterized in that
at least the steering angle and the transverse acceleration are determined by the determination means as vehicle dynamics variables, and
the plus or minus signs of the steering angle and the transverse acceleration are compared in this comparison.

It is advantageous if the vehicle dynamics variables thus determined include at least one measured yaw rate and one yaw rate determined by a mathematical model in particular.

An advantageous embodiment is characterized in that
the vehicle dynamics variables thus determined also include the transverse acceleration and the longitudinal speed of the vehicle, and
the absolute value of the yaw rate determined by the mathematical model is limited at the upper end by an upper limit value, at least the transverse acceleration and the vehicle longitudinal speed being used in determining the upper limit value.

It is advantageous
if a driver-independent triggering of the actuators takes place to regulate the at least one vehicle dynamics variable to be regulated if the deviation in the measured yaw rate from the yaw rate determined by a mathematical model, multiplied by a factor, exceeds a maximum allowed limit value, and
if the sensitivity of the regulator means is determined by this factor.

Multiplying the deviation between the measured yaw rate and the yaw rate determined by a mathematical model is equivalent to scaling. This permits an especially robust, inexpensive, and uncomplicated means of attenuating the stabilization measures.

In an advantageous embodiment, the factor has a value between zero and one,
the value zero indicating deactivation of the regulator means, and
the value one indicating operation of the regulator means at maximum sensitivity.

It should be pointed out that the advantageous embodiments mentioned above do not require any additional sensors besides the sensors that are present anyway in a vehicle dynamics control system. This means that no major increase in hardware complexity is required. It should also be pointed out that the vehicle dynamics control system is not completely altered by the present invention. Instead, in many embodiments, the present invention is limited to a variation of intervention threshold values of the vehicle dynamics control system as a function of vehicle dynamics variables.

DETAILED DESCRIPTION

In vehicle dynamics control systems in general, a setpoint yaw rate vGiAck is calculated first from steering angle Lw and vehicle longitudinal speed vx with the help of characteristic speed vch (vch is a vehicle constant). Then, using vehicle transverse acceleration ay, vehicle longitudinal speed vx, and optionally additional variables, the setpoint yaw rate is limited in absolute value toward the upper end. This yields setpoint yaw rate vGiSo. Value vGiBeg=ay/vx supplies a significant portion of the limit of the setpoint yaw rate because it is a stability limit. If the stability limit is exceeded on a flat road surface, the float angle of the vehicle increases and the vehicle becomes unstable. One might imagine the vehicle driving in a circle with a constant radius, where ay=vGi*vx, ay being the transverse acceleration, vGi being the measured yaw rate, and vx being the longitudinal speed of the vehicle. If vGi increases but ay does not increase (and therefore vGiBeg does not increase either), then the float angle increases and the vehicle becomes unstable. This is also confirmed mathematically by the fact that the larger value of vGi then exceeds stability limit ay/vx, which has not increased.

The following equations hold for above-mentioned variables vGiAck, vGiBeg and vGiSo:

$$vGiAck = \frac{vx \cdot Lw}{c \cdot [1 + (vx \cdot vx)/(vch \cdot vch)]}$$

as well as vGiBeg=ay/vx and vGiSo=f(vGiAck, vGiBeg), where c is the wheelbase.

For example, vGiSo may be selected as the minimum of vGiAck and vGiBeg. Thus, yaw rate system deviation DvGi0 may be determined as follows:

DvGi0=vGiSo-vGi, where vGi is the yaw rate measured by a yaw rate sensor, for example. Then, with the help of a wide variety of regulation methods, it is possible to calculate manipulated variables which will influence the vehicle performance in the desired manner. It is also possible to attenuate system deviation DvGi0 depending on the situation so that only weak regulator intervention measures or none at all are implemented. This is accomplished by the multiplication DvGi=DvGi0*V1, which is explained in greater detail below.

Figure 1:
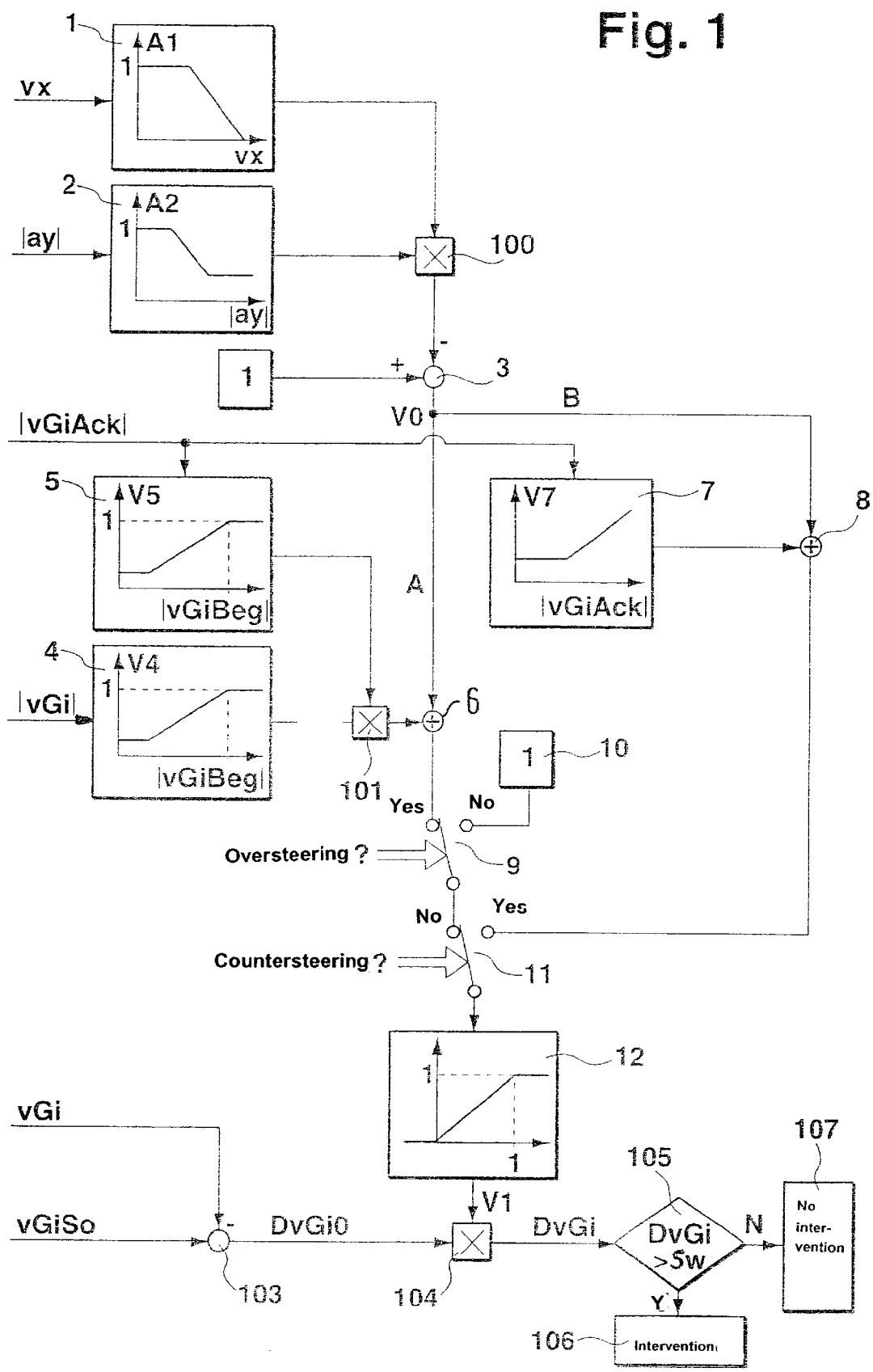
FIG. 1 shows the structure of the present invention in the form of a block diagram.

FIG. 1 illustrates the procedure for attenuation of regulation intervention measures.

In a block 1, a first attenuation factor A1 for attenuation of the regulation intervention measures between zero and one is predefined by a speed-dependent characteristic line (vx is plotted on the abscissa). At A1=0 there is no attenuation due to the contribution of first attenuation factor A1; at A1=1 there is a maximum attenuation due to the contribution of first attenuation factor A1, i.e., the regulation intervention measures are attenuated or even completely suppressed. Therefore, the attenuation may be implemented only at low speeds, for example. In a particular embodiment, this speed-dependent characteristic line may be a characteristic line having some linear segments.

The output signal of block 1 is multiplied by the output signal of block 2 in block 100. Block 100 is a multiplier. Block 2 contains a characteristic line which depends on the transverse acceleration. An attenuation factor A2 is calculated there as a function of the absolute value of transverse acceleration ay, i.e., |ay|. Instead of the characteristic line which depends on transverse acceleration, a characteristic line dependent on the coefficient of friction is also conceivable. Then the attenuation factor is determined as a function of the coefficient of friction. The coefficient of friction is a measure of the friction between the tire and the road surface. It depends on variables such as the properties of the road surface, the material of the tires, the wheel contact force or variables representing the vehicle dynamics. In a particular embodiment, block 2 may also include a characteristic curve having some linear segments. In the concrete embodiment, A2 assumes a value of 1 for small transverse accelerations |ay| and then decreases linearly to a smaller value with an increase in transverse acceleration.

Multiplier 100 supplies variable A1*A2 as the output signal. The result of multiplication A1*A2 is subtracted from one in logic block 3. Output signal V0 of block 3 thus corresponds to a gain for the regulation intervention measures, because V0=1−A1*A2. This yields the following limiting cases:

V0=0: maximum or even complete suppression of the regulating intervention measures V0=1: no suppression of the regulating intervention measures.

V0=1 occurs, for example, when A1 or A2 is zero. In other words, there is no suppression of regulating intervention measures at high longitudinal speeds of the vehicle or at high transverse accelerations. This is appropriate because potentially hazardous situations might occur then.

In the interpretation of the statements with regard to the "maximum suppression of the control measures" and/or "no suppression of the control measures," it should be kept in mind that V0 is the output signal generated by logic block 3. As the method proceeds, additional terms are also added to V0, ultimately generating signal V1. This signal V1 is the deciding measure for the sensitivity of the system as a whole. Variable V0 may be considered an intermediate variable.

Output signal V0 of block 3 is then relayed to two branches:

branch A: the driver steers in the direction of turning (this also includes steering back);

branch B: the driver steers against the direction of turning (countersteering).

The selection of one or the other branch will depend on the position of switch 11.

First, branch A will be considered, which is steering in the direction of the curve. Steering angle Lw and transverse acceleration ay in this case have the same plus or minus sign. The plus or minus signs may be selected, for example, so that in turning right, both the steering angle and the transverse acceleration have a plus sign, whereas in turning left, both have a minus sign (for example, a stable driving state may be assumed both in turning right and in turning left).

In block 4, the absolute value of yaw rate vGi thus determined (vGi is measured by a yaw rate sensor, for example) is evaluated with regard to stability limit vGiBeg (=ay/vx). Variable |vGi| is plotted on the abscissa, and variable V4 is plotted on the ordinate. If the absolute value of yaw rate |vGi| exceeds the value of |vGiBeg|, then the output of the characteristic curve implemented in block 4 is at 1 (V4=1). Therefore, if necessary, the regulator gain is diminished less or even not at all subsequently. At a smaller yaw rate, the output of the characteristic curve in block 4 rapidly drops to zero, because in this case stabilization of the vehicle by the regulator is no longer so urgent. If |vGi| is less than |vGiBeg|, then the vehicle float angle is automatically reduced, i.e., driving becomes more stable.

In a block 5, the dependence on the absolute value of setpoint yaw rate |vGiAck| and thus on the predefined steering angle is evaluated. Variable |vGiAck| is plotted on the abscissa and variable V5 is plotted on the ordinate. If |vGiAck| is near stability limit |vGiBeg|, then the output of a characteristic curve is in the vicinity of 1. The regulator gain is therefore decreased only slightly. However, if |vGiAck| is much smaller than |vGiBeg|, this means that the driver is steering back, i.e., the driver has taken over the stabilization function. In this case, the regulator gain may be reduced significantly. This also illustrates the statement made previously, namely that the regulator should assume the stabilization function in the case when the driver is steering back slightly (vGiAck is reduced only insignificantly with slight steering back), whereas when the driver steers back forcefully (vGiAck then assumes a small value), the regulator influence is reduced or even eliminated.

In particular embodiments, characteristic curves having some linear segments may of course be implemented in blocks 4 and 5.

The output signals of block 4 (output signal V4) and block 5 (output signal V5) are then multiplied in block 101, yielding a criterion for the change in the regulator gain which depends mainly on the steering angle (preselected by the driver) and the yaw rate (vehicle response). The result of the multiplication V4*V5 is added again to gain V0 in logic block 6, i.e., the gain decreased previously may be increased again here.

In the case of countersteering (branch B), the output of block 7 is added by logic block 8 to gain V0. Block 7 receives the absolute value of setpoint yaw rate vGiAck as an input signal. Block 7 calculates gain factor V7 (ordinate) as a function of |vGiAck| (abscissa). Up to a predefined value, which depends mainly on the steering angle, the output of block 7 remains at a low value or at zero and then increases continuously. Gain V0 is thus increased. This means that the previously reduced gain for the system deviation increases again starting at a preselectable threshold.

Then through query 9, a distinction is made between oversteering and not oversteering. Oversteering is detected by the fact that the absolute value of actual yaw rate vGi exceeds that of setpoint yaw rate vGiSo. If the vehicle is not oversteered, the gain in a block 10 is set fixedly at one. This is due to the fact that the gain is to be reduced by this algorithm only when the vehicle does not respond immediately when steered back, i.e., when the actual yaw rate exceeds the setpoint yaw rate. Through query 11, a distinction is now made between countersteering (Lw*ay<0) and steering into the curve (Lw*ay>0). In countersteering, the output of logic block 8 is relayed (branch B). If the answer to query 11 is in the negative, i.e., there is no countersteering, then the result of query 9 is relayed further (branch A).

The output signal of query 11 is then limited between zero and one in block 12, yielding gain V1, which is multiplied by the yaw rate system deviation (vGiSo−vGi) formed in subtraction block 103. In the characteristic curve stored in block 12, the output signal of query 11 is plotted on the abscissa (e.g., V0+V4*V5 or 1 or V0+V7) and V1 is plotted on the ordinate.

The multiplication is performed in multiplier 104. Normally, V1 has a value of 1, i.e., system deviation DvGi is equal to vGiSo−vGi and the regulator operates at full gain. Only if the calculation supplies a value of less than one is the system deviation attenuated and hence the stabilization measure attenuated. Therefore, in certain situations, sporty driving is supported with regulator intervention measures that are subjectively less interfering.

Signal DvGi is relayed to query block 105, where the query as to whether DvGi exceeds a threshold value Sw is made. The query is: DvGi>Sw? If DvGi exceeds threshold value Sw, then intervention measures into the vehicle dynamics control system are implemented by block 106. If DvGi does not exceed threshold value Sw, then no intervention measure into the vehicle dynamics control system is implemented (block 107).

The input signals of blocks 1, 2, 4, 5 and 7 are summarized below in key words:

block 1: input signal vx
block 2: input signal |ay|
block 4: input signal |vGi| block 5: input signal |vGiAck|
block 7: input signal |vGiAck|

Figure 2:
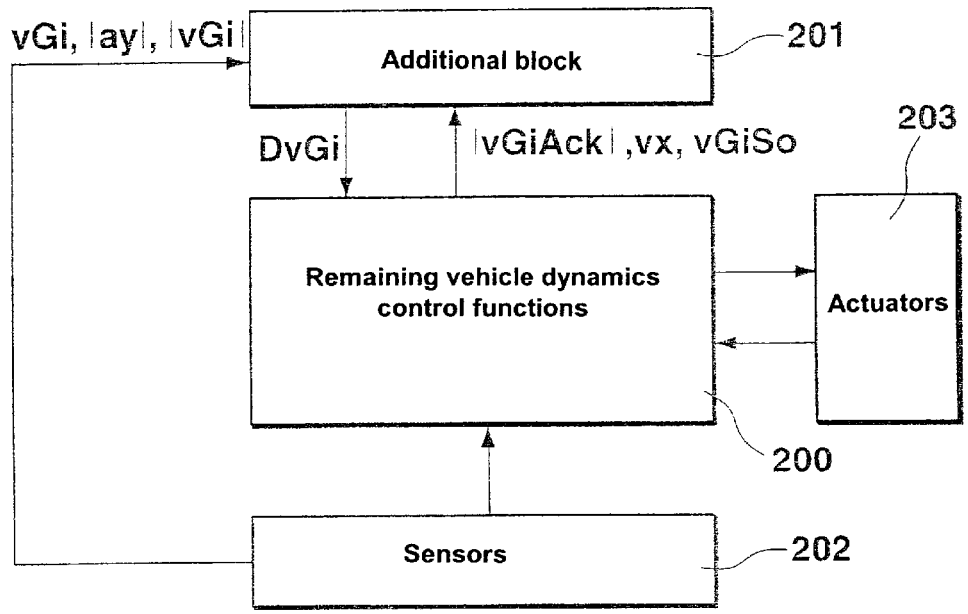
FIG. 2 shows how the present invention is embedded in the sensors, the actuators, and the vehicle dynamics controller.

FIG. 2 illustrates how the present invention is embedded in the system composed of sensors, actuators, and the vehicle dynamics controller. The actuators may be, for example, the wheel brakes or the engine control unit. Block 200 contains the "remaining" vehicle dynamics controller functions, i.e., the vehicle dynamics controller functions without the components included in the present invention.

Block 201 is referred to as an "additional block" and includes the present invention, as illustrated essentially in FIG. 1.

Block 202 contains the sensors.
Block 203 contains the actuators.

The following sensors are contained in block 202, for example: wheel rpm sensors, a yaw rate sensor, a steering angle sensor, a transverse acceleration sensor, brake pressure sensors.

The output signals of these sensors are sent to block 200 (remaining vehicle dynamics control functions), some of the output signals also being sent to block 201, which includes the present invention. The signals which are sent to block 201 in this specific embodiment are vGi, |vGi| and |ay|.

Block 201 contains additional input signals of block 200, namely |vGiAck|, vGiSo and vx. Longitudinal speed vx of the vehicle may then be determined from the wheel rotational speeds. The input signals of block 201 are also shown in FIG. 1, considering the input channels shown at the left edge from top to bottom.

In this embodiment, output signal DvGi is generated in block 201 and sent to block 200.

Block 200 controls actuators 203, which includes the individual wheel brakes, for example, as well as the engine control. The vehicle dynamics control system may thus initiate braking operations or de-braking operations on individual wheels or may intervene in the engine control (e.g., controlling the throttle valve position).

Figure 3:
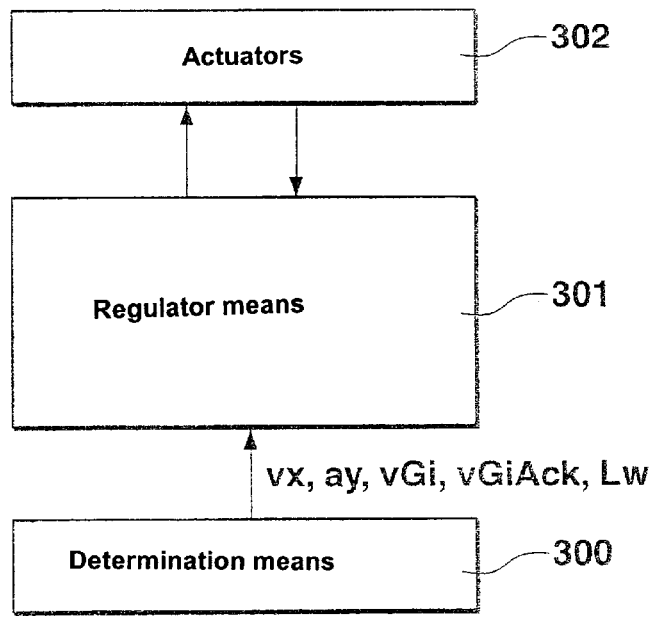
FIG. 3 shows the structure of the system as in FIG. 2, but subdivided into the blocks "determination means," "regulator means," and "actuators."

The system as a whole is illustrated again in FIG. 3. In contrast with FIG. 2, the system as a whole here is subdivided into the blocks "determination means," "regulator means" and "actuators."

Determination means 300 supply output signals vx, ay, vGi, vGIAck, and Lw (and possibly also other variables such as brake pressures). The variables go as input signals to regulator means 301. The regulator means in turn interact with actuators 302.

Instead of attenuating system deviation DvGi, the control intervention measure may, of course, also be attenuated at many other points in the regulating circuit, e.g., by reducing the regulator gain or by attenuating the manipulated variables (e.g., the changes in setpoint slip).

With regard to the present invention, it should be pointed out that the driver's behavior is also taken into account in this regulation system. This inclusion of the driver's behavior is accomplished, for example, through the setpoint yaw rate raw value (vGiAck) which is influenced by the driver by selecting steering angle Lw and vehicle longitudinal speed vx.

In conclusion, the most important mathematical variables used here shall be summarized for better understandability:
Lw=steering angle,
vGi=yaw rate,
vx=vehicle longitudinal speed,
vch=characteristic speed (vehicle constant),
ay=vehicle transverse acceleration,
vGiAck=setpoint yaw rate raw value,
vGiBeg=yaw rate limit value,
vGiSo=setpoint yaw rate,
DvGi0=yaw rate system deviation,
DvGi=yaw rate system deviation multiplied by factor V1.

What is claimed is:

1. A device for regulating at least one vehicle dynamics controlled variable that describes a motion of a vehicle, comprising:
   a determination device for determining at least one vehicle dynamics variable of the vehicle; and
   a regulator device for triggering actuators for regulating the at least one vehicle dynamics controlled variable, wherein:
   a sensitivity of the regulator device is influenceable, and
   the sensitivity of the regulator device in at least one operating state of the vehicle is influenced by at least one of the at least one vehicle dynamics variable that has been determined.

2. A device for regulating at least one vehicle dynamics controlled variable that describes a motion of a vehicle, comprising:
   a determination device for determining at least one vehicle dynamics variable of the vehicle; and
   a regulator device for triggering actuators for regulating the at least one vehicle dynamics controlled variable wherein:
   a sensitivity of the regulator device is influenceable, and
   the sensitivity of the regulator device in at least one operating state of the vehicle is influenced by at least one of the at least one vehicle dynamics variable that has been determined, and
   wherein:
   at least one transverse acceleration variable and at least one steering angle variable are determined by the determination device as vehicle dynamics variables, and
   the sensitivity of the regulator device is influenced according to one of the following:
   when driving with a transverse acceleration of the vehicle different from zero, and a driver-operated steering against a direction of the transverse acceleration exists as the at least one operating state, and
   when the vehicle is in an oversteered state, and driving with the transverse acceleration of the vehicle that is different from zero and a driver-operated steering in the direction of the transverse acceleration exists as the at least one operating state.

3. A device for regulating at least one vehicle dynamics controlled variable that describes a motion of a vehicle, comprising:
   a determination device for determining at least one vehicle dynamics variable of the vehicle; and
   a regulator device for triggering actuators for regulating the at least one vehicle dynamics controlled variable, wherein:
   a sensitivity of the regulator device is influenceable, and
   the sensitivity of the regulator device in at least one operating state of the vehicle is influenced by at least one of the at least one vehicle dynamics variable that has been determined, and
   wherein:
   at least one transverse acceleration variable and at least one steering angle variable are determined by the determination device as vehicle dynamics variables, and the sensitivity of the regulator device is influenced according to one of the following:
when driving with a transverse acceleration of the vehicle different from zero, and a driver-operated steering against a direction of the transverse acceleration exists as the at least one operating state, and
when the vehicle is in an oversteered state, and driving with the transverse acceleration of the vehicle that is different from zero and a driver-operated steering in the direction of the transverse acceleration exists as the at least one operating state.

4. A device for regulating at least one vehicle dynamics controlled variable that describes a motion of a vehicle, comprising:
a determination device for determining at least one vehicle dynamics variable of the vehicle; and
a regulator device for triggering actuators for regulating the at least one vehicle dynamics controlled variable, wherein:
a sensitivity of the regulator device is influenceable, and
the sensitivity of the regulator device in at least one operating state of the vehicle is influenced by at least one of the at least one vehicle dynamics variable that has been determined, and
wherein:
a comparison of one of a plus sign and a minus sign of two different determined vehicle dynamics variables is performed, and
the sensitivity of the regulator device is influenced as a function of an outcome of the comparison.

5. The device as recited in claim 1, wherein:
the at least one vehicle dynamics variable includes at least one measured yaw rate and a yaw rate determined by a mathematical model.

6. A device for regulating at least one vehicle dynamics controlled variable that describes a motion of a vehicle, comprising:
a determination device for determining at least one vehicle dynamics variable of the vehicle; and
a regulator device for triggering actuators for regulating the at least one vehicle dynamics controlled variable, wherein:
a sensitivity of the regulator device is influenceable, and
the sensitivity of the regulator device in at least one operating state of the vehicle is influenced by at least one of the at least one vehicle dynamics variable that has been determined;
wherein:
the at least one vehicle dynamics variable includes at least one measured yaw rate and a yaw rate determined by a mathematical model, and
wherein:
the at least one vehicle dynamics variable includes a transverse acceleration and a vehicle longitudinal speed,
the yaw rate determined by the mathematical model is limited in terms of an actual amount at an upper end by an upper limit value, and
at least the transverse acceleration and the vehicle longitudinal speed are used in determining the upper limit value.

7. A device for regulating at least one vehicle dynamics controlled variable that describes a motion of a vehicle, comprising:

a determination device for determining at least one vehicle dynamics variable of the vehicle; and
a regulator device for triggering actuators for regulating the at least one vehicle dynamics controlled variable, wherein:
a sensitivity of the regulator device is influenceable, and
the sensitivity of the regulator device in at least one operating state of the vehicle is influenced by at least one of the at least one vehicle dynamics variable that has been determined;
wherein:
the at least one vehicle dynamics variable includes at least one measured yaw rate and a yaw rate determined by a mathematical model, and
wherein:
the actuators are triggered independently of a driver to regulate the at least one vehicle dynamics variable to be regulated if a deviation in the at least one measured yaw rate from the yaw rate determined by a mathematical model, multiplied by a factor, exceeds a maximum allowed limit value, and
the sensitivity of the regulator device is determined by the factor.

8. The device as recited in claim 7, wherein:
the factor has a value between zero and one, the value of zero denoting a deactivation of the regulator device and the value of one denoting an operation of the regulator device at a maximum sensitivity.

9. A method for regulating at least one vehicle dynamics controlled variable that describes a motion of a vehicle, comprising:
determining at least one vehicle dynamics variable of the vehicle; and
causing a regulator device to trigger actuators for regulating the at least one vehicle dynamics controlled variable, wherein:
a sensitivity of the regulator device is influenceable, and
the sensitivity of the regulator device in at least one operating state of the vehicle is influenced by at least one of the at least one vehicle dynamics variable that has been determined.

10. A method for regulating at least one vehicle dynamics controlled variable that describes a motion of a vehicle, comprising:
determining at least one vehicle dynamics variable of the vehicle;
causing a regulator device to trigger actuators for regulating the at least one vehicle dynamics controlled variable, wherein:
a sensitivity of the regulator device is influenceable, and
the sensitivity of the regulator device in at least one operating state of the vehicle is influenced by at least one of the at least one vehicle dynamics variable that has been determined;
performing a comparison of one of a plus sign and a minus sign of two different determined vehicle dynamics variables; and
influencing the sensitivity of the regulator device as a function of an outcome of the comparison.

* * * * *

UNITED STATES PATENT AND TRADEMARK OFFICE
CERTIFICATE OF CORRECTION

PATENT NO.    : 6,757,605 B2
DATED         : June 29, 2004
INVENTOR(S)   : Uwe Hartmann It is certified that error appears in the above-identified patent and that said Letters Patent is hereby corrected as shown below:

<u>Title page,</u>
Item [57], ABSTRACT, change "motion of a vehicle is described." to -- motion of a vehicle --

<u>Columns 8-9,</u>
Lines 49-11, delete "3. A device...operating state."
        Change "4." to -- 3. --

Insert -- 4. The device as recited in Claim 3, wherein:
at least one steering angle and at least one
transverse acceleration are determined by the
determination device as vehicle dynamics
variables, and the one of the plus sign and the
minus sign of the at least one steering angle and
the at least one transverse acceleration are
compared in the comparison. --

Signed and Sealed this

Twenty-fourth Day of May, 2005

JON W. DUDAS
*Director of the United States Patent and Trademark Office*